US008620053B2

(12) United States Patent
Michel et al.

(10) Patent No.: US 8,620,053 B2
(45) Date of Patent: Dec. 31, 2013

(54) COMPLETION OF TRUNCATED ATTENUATION MAPS USING MAXIMUM LIKELIHOOD ESTIMATION OF ATTENUATION AND ACTIVITY (MLAA)

(75) Inventors: Christian J. Michel, Lenoir City, TN (US); Johan Nuyts, Heverlee (BE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 448 days.

(21) Appl. No.: 12/939,701

(22) Filed: Nov. 4, 2010

(65) Prior Publication Data

US 2011/0103669 A1 May 5, 2011

Related U.S. Application Data

(60) Provisional application No. 61/257,926, filed on Nov. 4, 2009.

(51) Int. Cl.
*G06K 9/00* (2006.01)

(52) U.S. Cl.
USPC ........................................................ 382/131

(58) Field of Classification Search
None
See application file for complete search history.

(56) References Cited

U.S. PATENT DOCUMENTS

| | | | |
|---|---|---|---|
| 8,280,135 B2 * | 10/2012 | McCollough et al. | 382/128 |
| 2006/0062442 A1 * | 3/2006 | Arnaud et al. | 382/128 |
| 2008/0073543 A1 * | 3/2008 | Vija et al. | 250/370.08 |
| 2008/0107229 A1 * | 5/2008 | Thomas et al. | 378/4 |
| 2009/0110256 A1 * | 4/2009 | Thielemans et al. | 382/131 |
| 2010/0128954 A1 * | 5/2010 | Ostrovsky-Berman et al. | 382/131 |
| 2010/0183214 A1 * | 7/2010 | McCollough et al. | 382/131 |
| 2010/0215238 A1 * | 8/2010 | Lu et al. | 382/131 |
| 2011/0058722 A1 * | 3/2011 | Hu et al. | 382/131 |
| 2011/0103669 A1 * | 5/2011 | Michel et al. | 382/131 |

OTHER PUBLICATIONS

Nuyts, et al., "Simultaneous maximum a-posteriori reconstruction of attenuation and activity distributions form emission sinograms", IEEE Trans Med Imaging, 1999; 18(5): 393-403.
Bronnikov, Andrei V., "Reconstruction of Attenuation Map Using Discrete Consistency Conditions", IEEE Trans Med Imaging, 2000; 19(5): 451-462.
Crepaldi, et al., "Activity and Attenuation Reconstruction for Positron Emission Tomography Using Emission Data Only Via Maximum Likelihood and Iterative Data Refinement", IEEE Trans Nucl Science, 2007; 54(1): 100-106.

* cited by examiner

*Primary Examiner* — Bhavesh Mehta
*Assistant Examiner* — Tahmina Ansari
(74) *Attorney, Agent, or Firm* — Peter Kendall

(57) ABSTRACT

The present invention is a method of generating a best estimate of an image attenuation map derived from a truncated image attenuation map and PET emissions data for the object being imaged by a morphological imaging modality. The method involves a plurality of steps beginning with the recordation and processing of PET emissions data. Next, the morphological imaging modality records image data which is processed to determine an attenuation map. The attenuation map, for image modalities such as CT and MR scanning systems integrated with PET, is truncated, resulting in a truncated attenuation map image. Pixels for which attenuation data needs to be determined are identified and attenuation coefficients for these pixels are estimated and combined with the truncated attenuation map to generate a full initial attenuation map for the image, which is iteratively processed together with the PET emission data until the improvement change in the emission image reaches a defined threshold improvement level.

11 Claims, 8 Drawing Sheets

COMPLETION OF TRUNCATED ATTENUATION MAPS USING MAXIMUM LIKELIHOOD ESTIMATION OF ATTENUATION AND ACTIVITY (MLAA)

BACKGROUND OF THE INVENTION

I. Field of the Invention

The present invention relates to methods of estimating imaged object attenuation maps and more particularly to the completion of truncated attenuation maps by estimating missing portions using Maximum-Likelihood Expectation Maximization (MLEM) reconstructive techniques.

II. Background Information

Nuclear medicine is a unique medical specialty wherein radiation is used to acquire images, which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions, which emanate from the body and are captured by a scintillation crystal, with which the photons interact to produce flashes of light or "events." Events are detected by an array of photo detectors, such as photomultiplier tubes, and their spatial locations or positions are calculated and stored. In this way, an image of the organ or tissue under study is created from detection of the distribution of the radioisotopes in the body.

One particular nuclear medicine imaging technique is known as Positron Emission Tomography, or PET. PET is used to produce images for diagnosing the biochemistry or physiology of a specific organ, tumor or other metabolically active site. Measurement of the tissue concentration of a positron emitting radionuclide is based on coincidence detection of the two gamma photons arising from positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors, i.e., the gamma photon emissions are detected virtually simultaneously by each detector. When two oppositely disposed gamma photons each strike an oppositely disposed detector to produce a time coincidence event, they also identify a line of response, or LOR, along which the annihilation event has occurred. An example of a PET method and apparatus is described in U.S. Pat. No. 6,858,847, which patent is incorporated herein by reference in its entirety.

After being sorted into parallel projections, the LORs defined by the coincidence events are used to reconstruct a three-dimensional distribution of the positron-emitting radionuclide within the patient. In two-dimensional PET, each 2D transverse section or "slice" of the radionuclide distribution is reconstructed independently of adjacent sections. In fully three-dimensional PET, the data are sorted into sets of LOR, where each set is parallel to a particular detector angle, and therefore represents a two dimensional parallel projection p(r, s, $\phi$, $\theta$) of the three dimensional radionuclide distribution within the patient—where "r" and "s" correspond to the radial and axial distances, respectively, of the LOR from the center of the projection view and "$\phi$" and "$\theta$" correspond to the azimuthal and polar angles, respectively, of the projection direction with respect to the z axis in (x, y, z) coordinate space (in other words, $\phi$ and $\theta$ correspond to a particular LOR direction).

Coincidence events are integrated or collected for each LOR and stored in a sinogram. In this format, a single fixed point in the emitter distribution f(x, y) traces a sinusoid in the sinogram. Each row of a sinogram contains the LOR data for a particular azimuthal angle $\phi$; each element of the row corresponds to a distinct radial offset of the LOR from the center of rotation of the projection. Different sinograms may have corresponded to projections of the tracer distribution at different coordinates along the scanner axis and/or different polar angles with respect to the scanner's axis.

FIG. 1 shows an embodiment of an exemplary PET system. A subject 4, for example a patient, is positioned within a detector ring 3 comprising scintillation photon detectors (such as PMT, APD, SiPM . . . ) 5. In front of the scintillation photon detectors 5 are individual crystals 8, also called detectors 8. A group of four scintillation photon detectors may have an array of detectors 8 in front of them. For example, an array of eight by eight or thirteen by thirteen detectors 8 (crystals) is possible, but any other array may be selected. Each detector 8 may be an individual crystal in front of respective scintillation photon detectors. As noted, during an annihilation process two photons 7 are emitted in diametrically opposing directions as schematically illustrated in circle 6. These photons 7 are registered by the PET as they arrive at detectors 8 in the detector ring 3. After the registration, the data, resulting from the photons 7 arriving at the detectors 8, may be forwarded to a processing unit 1 which decides if two registered events are selected as a so-called coincidence event. All coincidences are forwarded to the image processing unit 2 where the final image data may be produced via mathematical image reconstruction methods. The image processing unit 2 may be connected to a display for displaying one or more processed images to a user.

Positron emission tomography provides quantitative images depicting the concentration of the positron emitting substance throughout the patient. The accuracy of this quantitative measurement depends in part on the accuracy of an attenuation correction which accounts for the absorption of some of the gamma rays as they pass through the patient. The attenuation correction factors modify the sinogram, which contains the number of annihilation events at each location within the field of view.

Attenuation is the loss of detection of true coincidence events because of their absorption in the body or due to their scattering out of the detector field of view. Attenuation problems are greater with PET imaging compared to traditional nuclear medicine SPECT imaging. Even though the photons are of greater energy than those used in SPECT imaging, in PET imaging two photons must escape the patient simultaneously to be detected as a true event and the total photon path distance through the object/patient from emission to detection is greater with a PET camera than with a SPECT camera. The loss of true coincidence event detection due to attenuation in PET imaging can range between 50 to 95%, especially great in a larger person.

Loss of counts due to attenuation increases image noise, image artifacts, and image distortion. Without attenuation correction, significant artifacts which may occur on whole-body PET scans include: (1) prominent activity at body surface edges due to relative low attenuation at the surfaces compared to deeper structures, (2) distorted appearance of areas of intense activity (e.g. urinary bladder) due to variable degrees of attenuation in different directions of activity originating from these areas, and (3) diffuse, relatively increased activity in tissues of relatively low attenuation (e.g. lungs). Therefore, attenuation correction of data is necessary for accurate qualitative (i.e. visually normal, increased, or decreased) and quantitative (e.g. standardized uptake values or SUVs for FDG) measurements of radio-tracer activity.

In imaging systems integrating PET and CT imaging modalities, x-rays from a CT scan are used to construct an attenuation map of density differences throughout the body that may then be used to correct for the absorption of the photons emitted from radio-tracer decay. Attenuation is much more likely in the center of the body and therefore non-attenuation-corrected images will show diffusely lower levels of activity deep in the body in comparison to the skin surface. The attenuation correction process essentially "adds counts back" into areas that are more attenuated due to their being deeper or being surrounded by relatively dense structures. Similarly, it essentially "subtracts counts" from areas that are attenuated much less than all other tissues (e.g. lungs and body surfaces). Both attenuation-corrected and non-attenuation-corrected data sets are provided for review and both should be examined by the interpreter. Reviewing both data sets sometimes allows confirmation of an abnormality or confirmation of the benignity of a process which might have been incorrectly assessed based on review of one set alone.

In imaging systems integrating PET and CT imaging modalities, a fundamental hurdle that must be overcome to create an attenuation map is the truncation of the CT image resulting from the CT imaging portion of the system having a smaller field of view than that of the PET camera. This field of view problem also exists in imaging systems that integrate PET and MR imaging modalities, resulting in an even more truncated MR image than that of a CT image resulting from an integrated PET and CT imaging system. The field of view of the PET camera within an integrated or a hybrid imaging system is approximately 60 cm. The field of view of the CT imaging modality of an integrated or a hybrid imaging system is approximately 50 cm. It is possible to overcome the truncation problem in the PET-CT integrated system by collecting image data for a patient that has their arms up over their head during the imaging process which for some patients removes truncation. A patient holding their arms over their head is not a solution for PET-MR systems. The field of view of an MR imaging modality of an integrated or a hybrid PET-MR imaging system is approximately 40-45 cm. In the MR-PET integrated imaging system the conversion of the MR image values to linear attenuation coefficients at 511 keV adds another layer of complexity, because the MR imaging signal does not correlate with electron density.

It is also contemplated that the PET-MR imaging system may be comprised of a separate PET system such as the system disclosed in FIG. 1 and a separate MR system such as that illustrated in FIG. 2. According to FIG. 2, a magnetic resonance system has a base body 11. The base body 11 embodies a magnet system by means of which magnetic fields can be generated in an excitation region 12. The magnet system includes at least one basic magnet 13 for generation of a temporally static basic magnetic field that is spatially at least essentially homogeneous within the excitation region 12. The magnet system furthermore includes a whole-body antenna 14 by means of which a radio-frequency magnetic field can be generated that is at least essentially homogeneous in the entire excitation region 12. The magnet system normally additionally includes gradient magnets for generation of gradient fields and a shielding magnet. The magnetic resonance system includes a patient bed 15 that can be moved in a travel direction z over a travel region relative to the base body 11. The travel region is determined such that—as viewed in the travel direction z—each point of the patient bed 15 can be positioned in the excitation region 12. Since the excitation region 12 normally extends over an excitation region length I which is approximately 40 to 60 cm in the travel direction z and the patient bed exhibits a length L on the order of 2 m, the travel region length of the patient bed 15 is thus inevitably a multiple of the excitation region length I. Due to the mobility of the patient bed 15, an examination subject 16 (normally a person 16) can be brought into the excitation region 12 by corresponding movement of the patient bed 15. It is possible to acquire the emitted magnetic resonance signal by means of the whole-body antenna 14 and to feed it to an evaluation device 17 by which the magnetic resonance signal can be evaluated. However, only a qualitatively low-grade reconstruction of the examination subject 16 is possible in this manner. Local coils 18 by means of which a significantly higher-grade magnetic resonance signal can be acquired (even if only over a small volume per local coil 18) are therefore normally arranged on the examination subject 6.

There is a need for a system and methodology that integrates the use of both PET imaging and an alternative imaging modality, such as CT or MR, into the generation of image attenuation maps that solves the problems caused by the smaller field of view of the alternative imaging modality. Such a system and method needs to provide a solution for the above described attenuation correction problem resulting from a lack of correlation of the alternative imaging modality with the electron density of the emissions data resulting from PET imaging. In a system and method using data sets from both PET and an alternative imaging modality, as the gamma-quanta traverses everything that is inside the system's detector ring before being counted, there is gradual loss of intensity attenuated by the objects within the field of view (FOV). This attenuation must be accounted for through some form of attenuation correction in order to generate clinically relevant image quality. The ability to correct attenuation is not a new concept as it has been successfully accomplished in previous systems also allowing for accurate scatter correction.

The estimation of human attenuation from using MR image data is a difficult task. First, as a preliminary manner, when the alternative imaging modality is MR, the MR image or MR signal has little correlation with the electron densities or the associated linear attenuation coefficients (LAC) of human tissues at the annihilation radiation energy of 511 KeV, the source of radiation in PET. In addition, the transaxial MR field of view is usually a lot smaller (40-45 cm) than the PET field of view (60 cm) for several reasons, e.g. the inhomogeneity of the main field and the non-linearity of the gradients. There is a need for a system and method using data sets from both PET and an alternative imaging modality that incorporates a method of obtaining accurate LAC-values for an image outside the MR image visible field of view that are derived from truncated MR image data based on PET emission data collected for the object being imaged. Currently, MR based estimation of a PET attenuation map is done by segmenting the MR image into different tissue types and assigning the corresponding LAC values, as set forth in US patent Pub. No. US 2008135769. However, this approach alone is not sufficient for estimating the attenuation map outside the MR FOV.

Recently there have been efforts to use maximum-likelihood expectation maximization (MLEM) algorithms to simultaneously reconstruct a complete attenuation map from the PET data emissions data. The success was limited because there was too much missing information. The present invention provides a solution to this problem. This class of algorithms usually converges to a local maximum and therefore has to be constrained to obtain the desired solution. Constraints are generally given by prior information on the smoothness of the emission and attenuation images or allowing discrete values for the attenuation coefficients. Other approaches for MR-based attenuation correction make use of an atlas, model or reference image with known attenuation, e.g. from some co-registered corresponding CT, PET transmission image or body contours derived from optical 3D scanning. The actual MR image is then registered to the atlas or reference with known attenuation and the actual attenuation map is deduced from the registration information.

Notwithstanding the above, the methodology for deductively generating an attenuation map outside the MR imaging modality field of view using an atlas is not particularly straightforward. Accordingly, there is a need for a straightforward method of deducing a complete attenuation map using a truncated image captured by imaging modalities having a field of view that is smaller than that which is necessary to capture a full image.

SUMMARY OF THE INVENTION

Consistent with embodiments of the present invention, the present invention comprises a method of generating a best estimate of a complete attenuation map derived from a truncated image and PET emissions data for the object being imaged. The method involves a plurality of steps beginning with the recordation and processing of PET emissions data to determine pixels within a PET imaging system or an integrated hybrid system which includes PET and a morphological imaging modality. Next, the morphological imaging modality as a stand alone system or as part of an integrated hybrid system records image data which is processed to determine an attenuation map. The attenuation maps, are for image modalities such as CT and MR truncated because the field of view of the morphological imaging modality is smaller than the field of view of the PET camera. This results in a truncated image attenuation map. The pixels comprising the truncated image attenuation map are compared to the pixels identified as including image data from the processing of PET emissions data to identify pixels for which attenuation data needs to be determined. The present invention comprises a method of generating initial estimated attenuation coefficients for the pixels identified as needing attenuation data and iteratively improving on these estimated attenuation coefficients by processing each successively improved group of estimated attenuation coefficients in an iterative loop until the measured improvement change in the most recently reconstructed emission images falls below a defined threshold improvement level. These pixels with iteratively improved estimated attenuation coefficients are combined with the pixels within the truncated attenuation map to generate a complete attenuation map.

It is to be understood that both the foregoing summary of the invention and the following detailed description are exemplary and explanatory only, and should not be considered restrictive of the scope of the invention, as described and claimed. Further, features and/or variations may be provided in addition to those set forth herein

BRIEF DESCRIPTION OF THE DRAWINGS

The accompanying drawings, which are incorporated in and constitute a part of this disclosure, illustrate various embodiments and aspects of the present invention. In the drawings.

GENERAL DESCRIPTION

Figure 1:
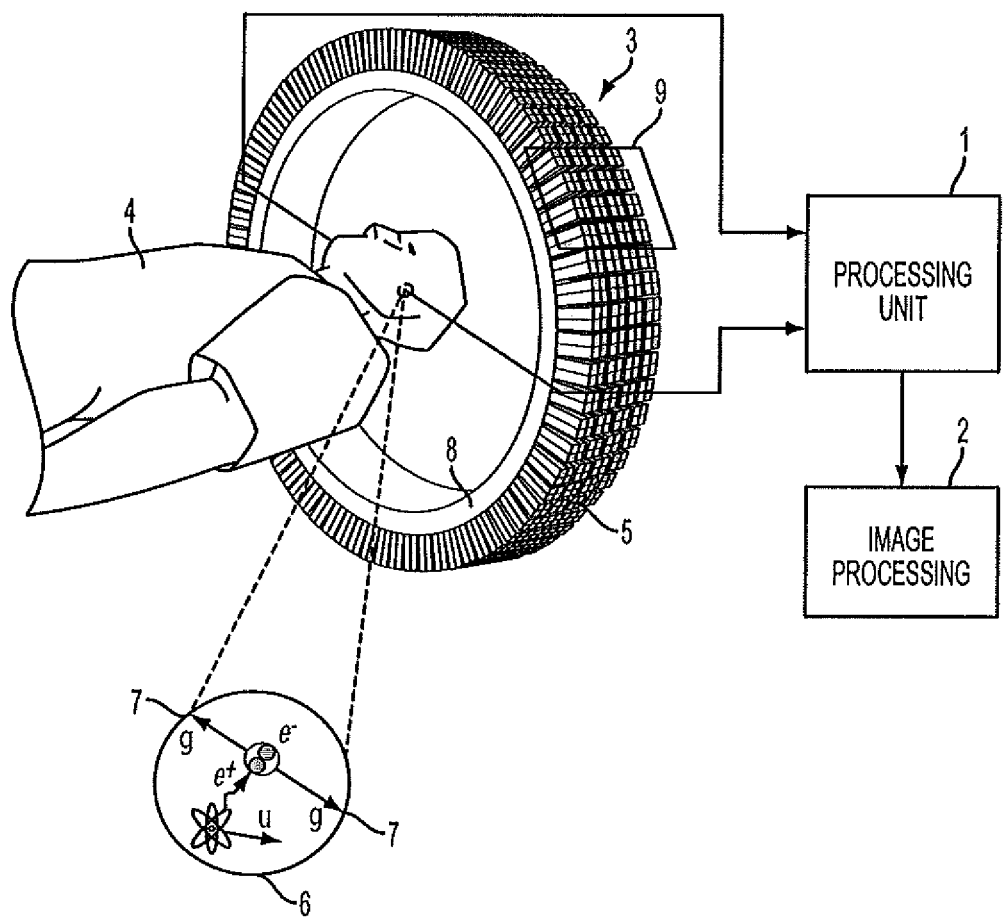
FIG. 1 is a perspective view of a PET imaging system.

Consistent with embodiments, the present invention concerns attenuation correction in PET imaging systems which has become standard in many clinical applications and enables reconstruction of local tracer concentration. The present invention involves a method of generating a best estimate of a complete attenuation map derived from processing of a truncated image of an object collected by a second imaging modality and PET emissions data for the imaged object. The method is implemented using a PET system in combination with a second image modality system or in a hybrid imaging system including PET imaging that is integrated with a second imaging modality, such as CT, MR or other modalities capable of providing the anatomical information required to create accurate attenuation maps for quantitative PET reconstruction. In one embodiment, the second image modality comprises a CT-scanner. In another embodiment, the second image modality may be MR. An integrated system involving PET and MR imaging combines the high soft tissue contrast of MR imaging and the functional information provided by PET emission data. Generally, in order to obtain quantitative PET emission information, correction of tissue photon attenuation is mandatory.

In conventional PET imaging systems, the complete attenuation map is obtained from a transmission scan, which uses a rotating source. In the present invention involving PET and a second imaging modality, the field of view of the second imaging modality is smaller than the field of view of the PET camera. In addition, when the imaging system(s) involves PET and MR as two stand-alone or as an integrated hybrid system, the MR images provide information about e.g. proton density or relaxation times of the different tissue types within the body being imaged. For systems in which MR is involved as the second imaging modality, it is not a simple process to use MR image data for PET attenuation correction; because, MR image data has no direct correlation with photon attenuation in PET emission data. Accordingly, the simple approach typically utilized in systems wherein the second imaging modality is CT, wherein the CT values are scaled to a different energy range in order to construct the attenuation map, is not feasible for systems in which MR is involved as the second imaging modality.

The present invention is a method involving the processing of a truncated image to generate a truncated image attenuation map that is processed in combination with PET emission data to determine the maximum likelihood of attenuation activity within the missing portion of the truncated attenuation map. The truncated image attenuation map and the estimated attenuation at the missing portion of the truncated image attenuation map are combined to create a full and more accurate attenuation map. The missing portion of the truncated attenuation map is determined by performing a plurality of steps. First, an initial estimation of attenuation coefficients within the missing portion is generated. The initial estimation is iteratively improved upon by processing each successively improved group of estimated attenuation coefficients within the missing portion of the truncated attenuation map in an iterative loop until the improvement change falls below a defined threshold improvement level. The iteratively improved estimated attenuation coefficients within the missing portion are combined with the truncated image attenuation map to generate a complete attenuation map.

It is to be understood that in one embodiment, the method of the present invention may be implemented by a software module. The method of estimating the maximum likelihood of the emission image data and the attenuation within the missing portion of the truncated attenuation map, given the measured PET emission data and the measured portion of the truncated attenuation map, incorporates a maxim urn-likelihood (ML) and maximum-a-posteriori (MAP) reconstruction methodology described in greater detail in J Nuyts, P Dupont, S Stroobants, R Benninck, L Mortelmans, P Suetens. "Simultaneous maximum a-posteriori reconstruction of attenuation and activity distributions from emission sinograms." *IEEE Trans Med Imaging*, vol 18 (5): 393-403, 1999, herein incorporated by reference in its entirety.

DETAILED DESCRIPTION

The following detailed description refers to the accompanying drawings. Wherever possible, the same reference numbers are used in the drawings and the following description to refer to the same or similar parts. While several embodiments and features of the invention are described herein, modifications, adaptations and other implementations are possible, without departing from the spirit and scope of the invention. Rather these embodiments are provided so that this disclosure will be complete and will fully convey the invention to those skilled in the art. For example, substitutions, additions or modifications may be made to the components illustrated in the drawings, and the methods described herein may be modified by substituting, reordering or adding steps to the disclosed methods. Accordingly, the following detailed description does not limit the invention. Instead, the proper scope of the invention is defined by the appended claims.

The present invention solves existing needs in the art by providing a method whereby an imaging system including PET and a second alternative imaging modality compensates for the fact that the transaxial field of view of the second imaging modality of the system is smaller than that of the field of view of the system's PET camera. Compensation occurs by determining an attenuation map that best fits the log-likelihood of the measured PET emission data for the missing portion of the attenuation map.

Figure 3:
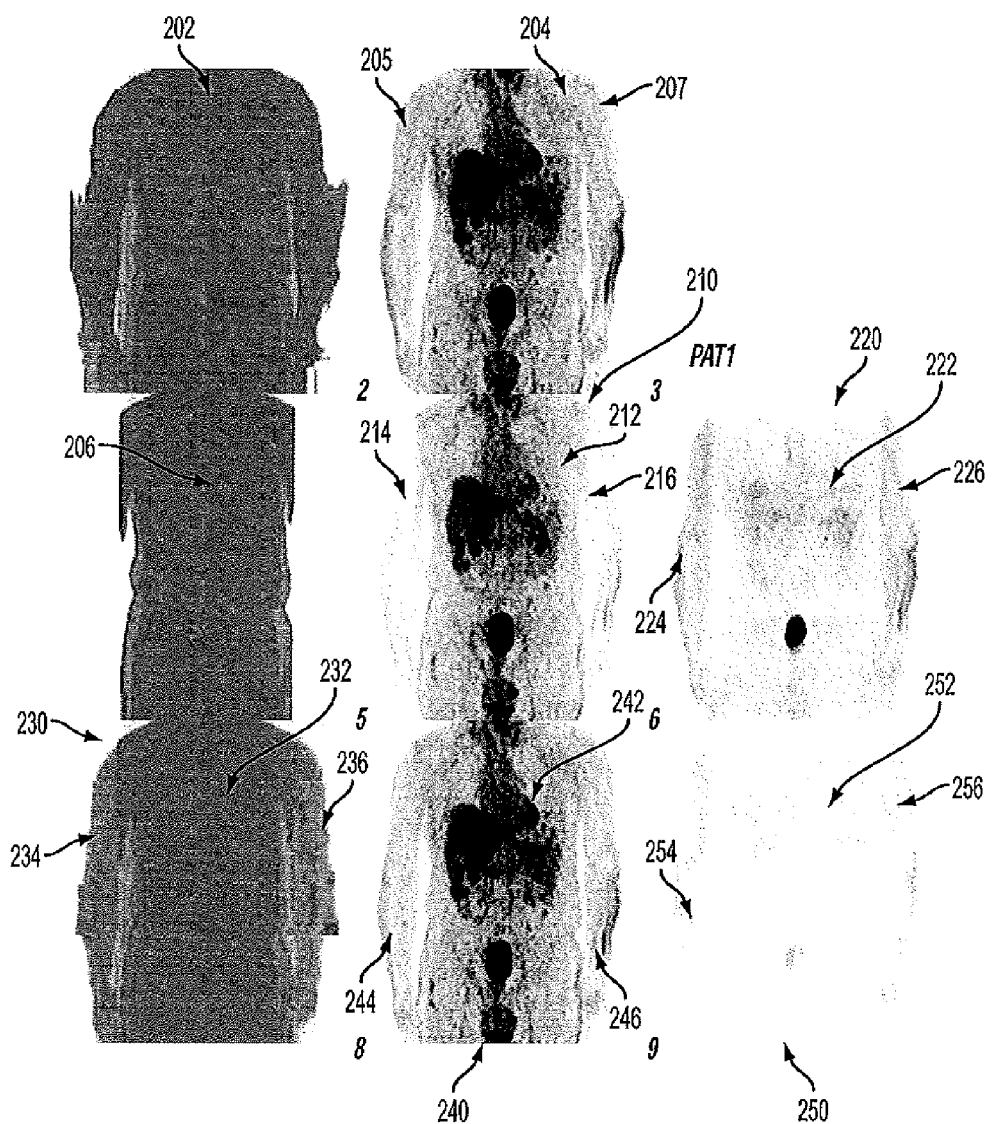
FIG. 3 is an illustration of the validation of the MLAA method on a whole-body FDG study using maximum intensity projection (MIP) for the attenuation map and emission image and the progression to generation of a completed attenuation image and the corresponding PET emission image.

Referring to FIG. 3, a maximum intensity projection (MIP) of a segmented attenuation map 202 derived from an untruncated attenuation image collected by a morphological image modality is illustrated. An emission image that has been reconstructed, taking into consideration PET emissions data collected for the imaged object and the attenuation map 202, is represented by optimal reconstructed MIP image 204. With the use of PET emissions data and the attenuation map 202 for the object in the example illustrated, the reconstructed MIP image 204 illustrates internal organs, which is what is expected. Image 202 and image 204 illustrate the expected occurrences for the attenuation map 202 and the optimal reconstructed image 204 of an imaged object when the reconstructed image 204 is projected using a complete attenuation map such as attenuation map 202. In imaging systems that use two imaging modalities such as PET and CT, PET and MR, or PET and an another alternative imaging modality, wherein the resulting image attenuation map is truncated, as illustrated in attenuation map 206, the present invention compensates for the truncated (missing) portion of the image attenuation map by generating the missing portion of the attenuation map. The missing portion of the attenuation map is generated by projecting that best estimate of the missing portion of the attenuation map and by processing the measured PET emission data which has been recorded for the entire image taking into consideration the fixed part of the attenuation correction and performing an iterative process whereby the most likely attenuation map is generated.

In one embodiment, the imaging system is comprised of a hybrid PET-MR imaging system that combines the high soft tissue contrast of a MR imaging modality and the functional information of PET emission data. The first step in this process is a recordation of PET emissions data. This data set is used to determine the physical dimensions (the extend of the spatial support) of the imaged object. Determining the physical dimensions of the imaged object involves an identification of a complete set of the image pixels that include emissions data and thereby those pixels needed to facilitate generation of a complete attenuation image of the object being imaged. Next, an MR image of the object recorded simultaneously or sequentially is processed and an attenuation map 206 is generated. As image 206 illustrates, the attenuation map generated is truncated, missing a portion, because the trans-axial field of view of the MR imaging portion of the hybrid integrated imaging system is smaller than that of the field of view of the system's PET camera. Reference image 220 is illustrated in FIG. 3 to show the difference between reconstructed image 210 and optimal reconstructed image 204. All images are presented as MIP.

As illustrated in image 210, the portions of the image representing the arms, 214 and 216 are faint and almost non-existent because there is no attenuation for those regions in the reconstruction process. It is assumed that the attenuation for that portion of the image is air. The phenomenon illustrated in portions 214 and 216 of the image is characterized as the local effect; simply a decrease in intensity of the image at the missing portions of a reconstructed image in the areas where there is no attenuation map. Image 220 illustrates the level of error caused in the reconstruction process by neglecting the arms by using air as the attenuation coefficient of the missing potions.

As image 220 illustrates, the errors caused in the reconstruction process when the missing portions of the attenuation map are ignored have a local effect, showing, within portions 224 and 226 of image 220, the level of difference between reconstructed optimal portions 205 and 207 of image 204 and reconstructed truncated portions 214 and 216 of image 210, where the missing portions of the attenuation map were ignored. The extent of the local effect is illustrated within portions 224 and 226 of image 220. The remote effect of the truncated attenuation map is illustrated in portion 222 of image 220, wherein it is illustrated that the missing portions of truncated attenuation map 206 has some effect on the known portion of attenuation map 206 as illustrated in portion 222 of image 220.

Images 230, 240 and 250 illustrate the effect of utilizing the Maximum Likelihood Attenuation Activity (MLAA) algorithm:

$$Q(\hat{\lambda},\hat{\mu};y,m)=L(\hat{\lambda},\hat{\mu};y,m)+P_1(\hat{\mu})+P_2(\hat{\mu})+P_3(\hat{\lambda}).$$

on a truncated attenuation image 206. In this algorithm Q (maximum likelihood) is equal to L (likelihood) plus the constraints P1, P2, P3. This is representative of the posterior probability function that is being maximized. As illustrated, the use of MLAA facilitates the generation of a complete attenuation map 230. The completed attenuation map is processed along with PET emissions data to reconstruct an image 240. The effect of using the MLAA algorithm to generate a complete attenuation map 230 as compared with an un-truncated attenuation map 202 is illustrated in image 250, wherein a comparison of reconstructed image 240 is done with the optimal reconstructed image 204. As shown in image 250, the effect of generating attenuation map portions 234 and 236 to create image 240 and reconstructed image portions 244 and 246, is illustrated in image portions 254 and 256, illustrating the difference between image portions 244 and 246 and optimal reconstructed image portions 205 and 207. The difference between image 250 and image 204 in the central portion 252 is negligible.

One step in the process of reconstructing an emission image through processing of a truncated attenuation map and PET emissions data is an identification of pixels that include imaged object data. This identification is made by e.g. thresholding an image obtained by reconstructing a binary sinogram obtained by thresholding the PET emission sinogram which provides the convex hull of the body. For each pixel having a value that exceeds the respective threshold level, it is understood that an attenuation coefficient needs to be determined.

In the present embodiment, the imaging system is comprised of an integrated PET-MR imaging system. Using data generated by the imaging system, following the capture of MR image data and PET emissions data, the next step of the method is to analyze MR image data of the imaged object to determine which of the pixels identified include object image data that has been seen by the MR scanner. It is to be understood that MR image data and PET emissions data may be captured simultaneously, when the integrated system is a hybrid system that combines both imaging methodologies, or sequentially when the system is comprised of integrated stand alone PET and MR imaging systems. The pixels identified as including object image data that have not been seen by the MR scanner are representative of a truncated/missing portion of the MR image. The pixels identified as missing MR image data are the pixels that need to be updated by having the PET emissions data processed by a maximum-a-posteriori (MAP) algorithm in order to estimate the attenuation map for the pixels associated with the missing portion of the MR image. Performing reconstruction using a MAP algorithm is an attempt to minimize the distance between the measured projection and the calculated projection. This is the basic principle of image reconstruction based on maximum likelihood expectation maximization (MLEM) adding prior knowledge on emission and attenuation images.

The pixels that are identified as having been seen by the MR scanner and thereby including MR image data are processed (forward projection and exponentiation) to determine attenuation correction for the respective pixels that comprise a truncated MR attenuation map.

The method of determining an initial attenuation map and determining image attenuation is illustrated in FIG. 3. A first step in the method is the generation of projection data representative of an un-truncated PET emission sinogram. Image 302 is representative of one slice through the imaged object (human body). This projection data is representative of emissions data that has been corrected for everything except attenuation. Next an edge finding process is performed to create a binary mask of the un-truncated PET emission sinogram data 302. As illustrated by the binary mask image 306, black represents zero and white represents one. The binary mask is then back projected (going from projection space to image space) as illustrated in image 310. This resultant intermediate image 310 is thresholded to delineate the convex hull of the object being imaged (body). Next, the pixels upon which an image of the convex hull may be associated are assigned an attenuation coefficient. In the present embodiment, the attenuation coefficient assigned is that of water 314. Next the attenuation map of the convex hull 314 is merged together with the truncated attenuation map 316 of the image to create an initial un-truncated attenuation map 318. This initial un-truncated attenuation map 318 is comprised of the truncated image 316 and convex hull edge portions 322 and 324 from the convex hull attenuation map 314. Next, an initial attenuation correction needs to be calculated from the initial un-truncated attenuation map 318. This is done by performing a forward projection on initial un-truncated attenuation map 318 and generating from the exponent of the forward projection an attenuation sinogram for PET 320. It is to be understood that the initial un-truncated attenuation map 318 is not correct as it needs to be processed through an iterative process illustrated in FIG. 4.

Figure 4:
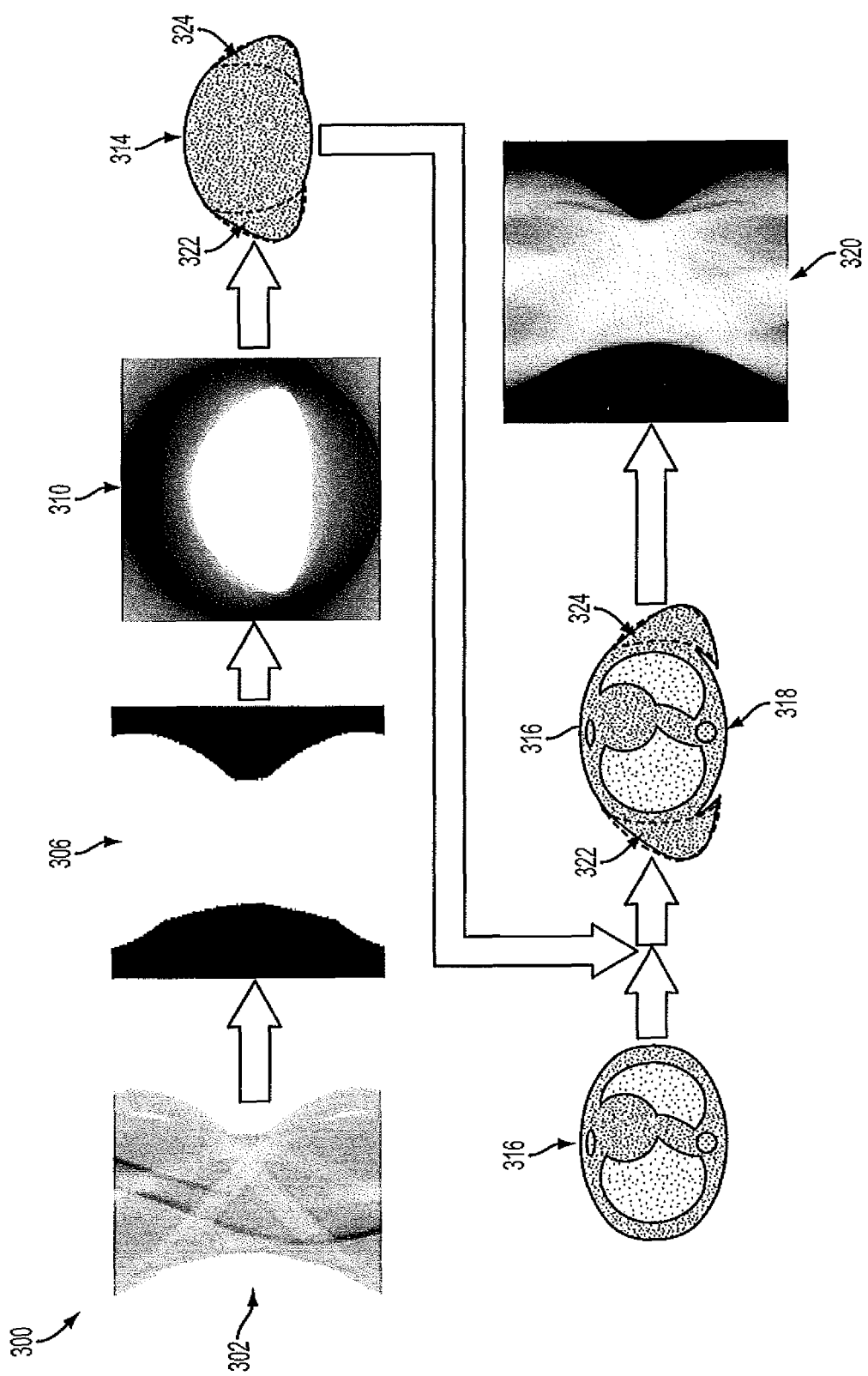
FIG. 4 is an illustration of process of determining an initial attenuation map.

Referring to FIG. 4, the initial un-truncated attenuation map 318 becomes the current un-truncated attenuation map 342 for which current attenuation correction needs to be calculated. This is done by performing a forward projection process and making the exponent of the forward projection of the initial un-truncated attenuation map 342. This results in the generation of the current attenuation correction for PET 320. The current PET attenuation correction sinogram 320 along with the un-truncated PET emission sinogram 328 are processed to generate the current emission image 332 using a MAP emission reconstruction (i.e an MLEM reconstruction with some spatial constraints provided by a relative difference prior, further detail can be found in in J Nuyts, D Beque, P Dupont, and L Mortelmans, "A concave prior penalizing relative differences for maximum-a-posteriori reconstruction in emission tomography," *IEEE Trans Nucl Sci*, vol. 49, pp. 56-60, 2002, herein incorporated by reference in its entirety.). The current attenuation corrected emission image 332 is forward projected to generate a pseudo blank scan 338. This blank scan 338 is a transmission scan obtained by using the positron radiation emitted by the patient as the source. Using the measured attenuated PET emission sinogram 328 as a transmission and the blank scan 338 a new estimate of the attenuation image 340 is obtained using the classical MAP-TR algorithm, with some spatial constraints (relative difference prior) and intensity constraints (favoring attenuation coefficients for air and tissue) (For details see J. Nuyts_, P. Dupont_, S. Stroobants_, A. Maes_, L. Mortelmans_, P. Suetens, "Evaluation of Maximum-Likelihood based Attenuation Correction in Positron Emission Tomography", *IEEE Trans Nucl Sci*, vol 46 (4): 1136-1141, 1999, herein incorporated by reference in its entirety). Next the new updated un-truncated attenuation map 340 replaces and becomes the current un-truncated attenuation map 342 and the process is continued in a loop in a clockwise manner. By performing the loop process illustrated in FIG. 4, the likelihood of the emission image improves with each completed loop. The loop may be discontinued when the improvement change in the emission image or the likelihood is less than a previously defined threshold level. It is also contemplated that the loop may simply be performed a set number of loops.

The above described method of determining an initial attenuation map and determining image attenuation illustrated in FIGS. 3 and 4 may be implemented in an estimation software module. A first step in the method implemented by the estimation software module is to import measured PET emissions data (un-truncated) 352. Next, an image captured by the second imaging modality is imported into the system 354. Next an edge finding process is performed to create a binary mask of the un-truncated PET emission sinogram data 356. The binary mask is then back projected (going from projection space to image space) to generate an intermediate image 358. This resultant intermediate image is thresholded to delineate the convex hull of the object being imaged (body). Next, the pixels upon which an image of the convex hull may be associated are assigned an attenuation coefficient 360. A determination is also made as to whether the image captured by the second imaging modality is truncated 362. If the image is not truncated, the processing steps end. If the image is truncated, the truncated image is converted to an attenuation map 364. Next the attenuation map of the convex hull is merged together with the truncated attenuation map 370 of the image to create an initial un-truncated attenuation map. This initial un-truncated attenuation map is comprised of the truncated image and portions of the convex hull identified as missing from the truncated image.

Figure 7:
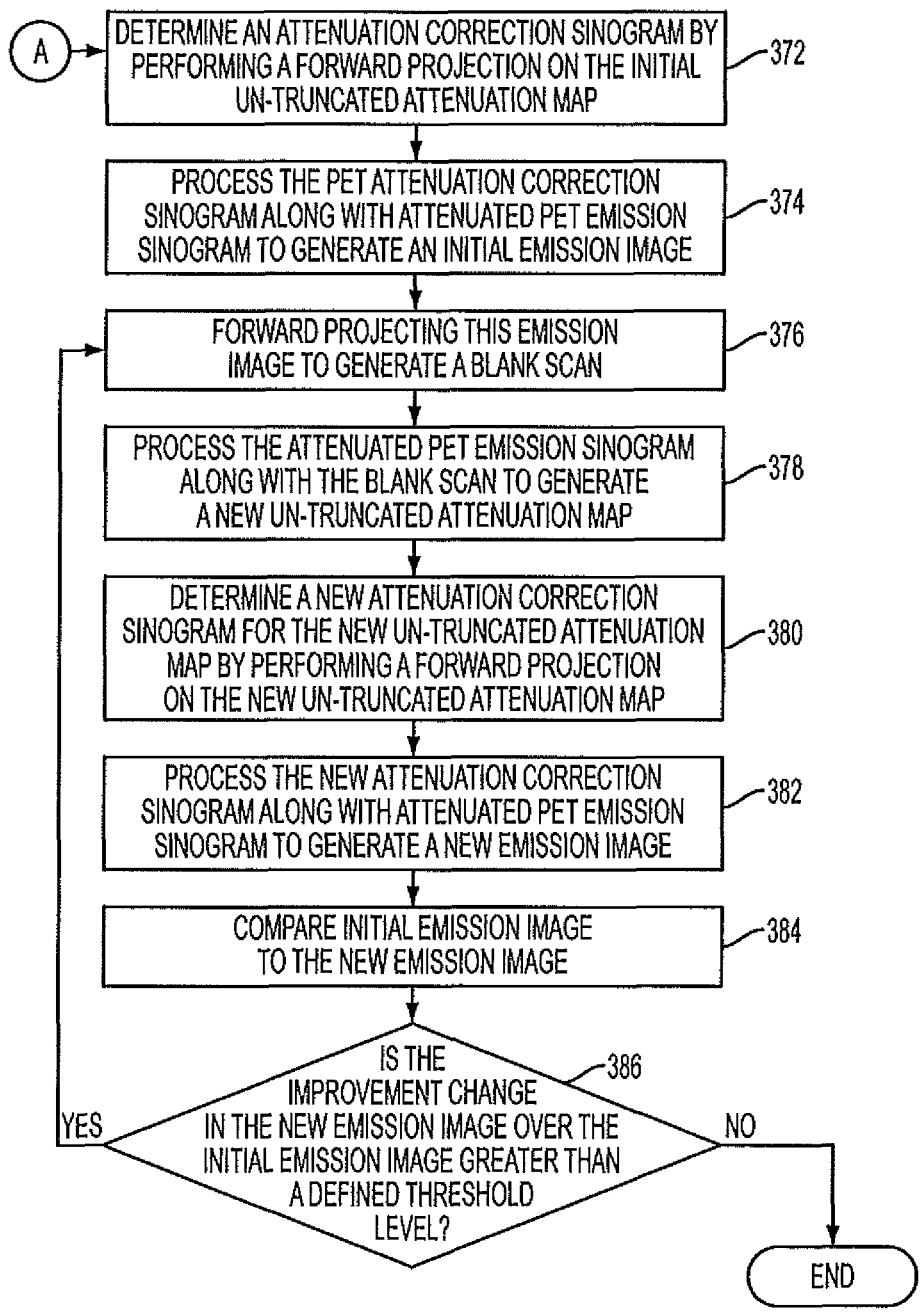
Figure 8:
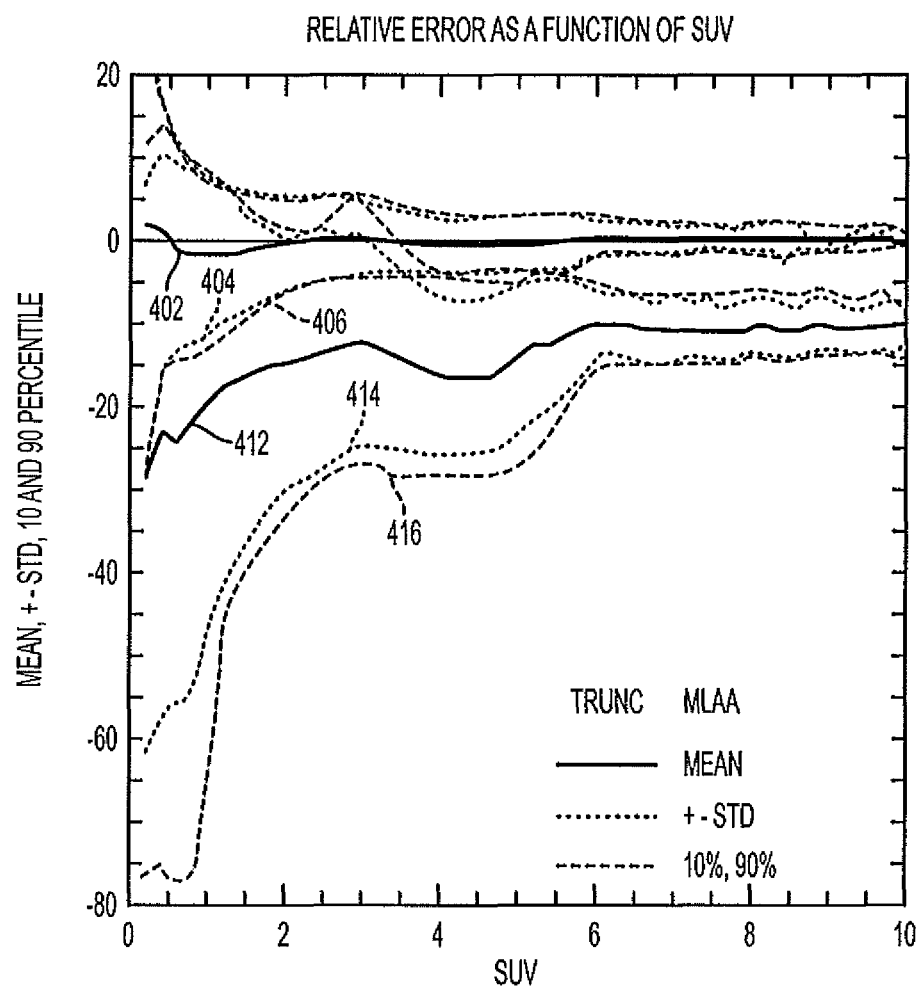

Next, as illustrated in FIG. 7, an initial attenuation correction sinogram needs to be calculated from the initial un-truncated attenuation map 372. This is done by performing a forward projection on initial un-truncated attenuation map 372. The current PET attenuation correction sinogram along with the un-truncated PET emission sinogram are processed to generate an initial emission image 374. The current attenuation corrected emission image is forward projected to generate a pseudo blank scan 376. Using the measured attenuated PET emission sinogram and the blank scan a new estimate of the attenuation image is obtained using the classical MAP-TR algorithm 378. Next the new un-truncated attenuation map is processed and a new attenuation correction sonogram is generated 380. This new attenuation correction sinogram is processed along with attenuated PET emission sonogram data to generate a new emission image 382. A comparison of the initial emission image and the new emission image is performed 384. If the improvement change in the new emission image over the initial emission image is greater than a defined threshold 386, the process loops back to step 376 where the new emission image is forward projected to generate a pseudo blank scan. This loop is performed until the improvement change in the new emission image over the initial emission image is less than a defined threshold, causing the process to end.

DISCUSSION

To determine an attenuation map, data sets from operation of an integrated PET-MR imaging system are collected. As illustrated in forward projection equation 1 below, $y_i$, represents the measured (attenuated) PET data acquired by detector pair i. The expectation of the data $y_i$ may be written as follows:

$$\bar{y}_i = \sum_j g_{ij} a_i \lambda_j \text{ and } a_i = \exp\left(-\sum_j l_{ij}\mu_j\right)$$

where $\lambda_j$ is the amount of radioactivity in image pixel j, gij is the probability that a unit activity in j contributes a detection to line of response (LOR) i in absence of attenuation, $a_i$ is the probability that a photon pair travelling along LOR i will not be attenuated, $i_{ij}$ is the intersection length of LOR i with voxel j, and $\mu_j$ is the linear attenuation coefficient in voxel j.

Assuming perfect conversion from MR imaging values to linear attenuation coefficients, the MR image provides reliable estimates of $\mu_j$ in the central part of the PET field of view. Outside that region, however, $\mu_j$ is unknown, as a result of the MR image being truncated. Equation (2) below denotes the region where $\mu_j$ is known as K and its complement as U.

$$a_i = m_i \exp\left(-\sum_{j\in U} l_{ij}\mu_j\right) \text{ with } m_i = \exp\left(-\sum_{j\in K} l_{ij}\mu_j\right)$$

The PET data is acquired to produce the image $\hat{\lambda}$, which is an estimate of the true tracer distribution $\lambda$. To reconstruct this image from the data y, we have to estimate the unknown attenuation values $\{\mu_j, j\in U\}$ as well. Because PET data are Poisson distributed, the log-likelihood of this estimation problem may be written as follows:

$$L(\hat{\lambda}, \hat{\mu}; y, m) = \sum_i y_i \ln(\hat{y}_i) - \hat{y}$$

$$\hat{y}_i = \sum_j g_{ij}\hat{a}_i\hat{\lambda}_j$$

$$\hat{a}_i = m_i \exp\left(-\sum_{j\in U} l_{ij}\hat{\mu}_j\right)$$

This function is maximized to estimate $\hat{\mu}$ and $\hat{\lambda}$. Because this problem is under-determined, regularization is recommended. To encourage smooth solutions of $\hat{\mu}$, two priors are combined. The first prior $P_1(\hat{\mu})$ favors the attenuation coefficients of air and tissue. It is assumed that the truncated image will contain mostly air, tissue and bone. The lungs should be in region K. The prior is created by combining Gaussian functions, centered at the favored attenuation values, described in greater detail in J. Nuyts_, P. Dupont_, S. Stroobants_, A. Maes_, L. Mortelmans_, P. Suetens, "Evaluation of Maximum-Likelihood based Attenuation Correction in Positron Emission Tomography", *IEEE Trans Nucl Sci*, vol 46 (4): 1136-1141, 1999. This prior has obviously local maxima, and more so when the number of favored attenuation values increases. For that reason, no additional mode for bone shall be added. The second prior $P_2(\hat{\mu})$ is the relative difference prior, a Markov prior similar to the quadratic prior, except that it penalizes relative differences between neighboring pixels rather than absolute differences. In addition, it has a parameter γ which optionally introduces increased tolerance of the prior to large relative differences. The parameter γ is described in further detail in J Nuyts, D Beque, P Dupont, and L Mortelmans, "A concave prior penalizing relative differences for maximum-a-posteriori reconstruction in emission tomography," *IEEE Trans Nucl Sci*, vol. 49, pp. 56-60, 2002, herein incorporated by reference in its entirety.

The reconstruction of the activity image is also regularized with the relative difference prior. Because its parameters may be different from the parameters used in $P_2(\hat{\mu})$, we denote it with a different symbol $P3$ ($\hat{\lambda}$). Thus, the objective function L of equation (3) above is replaced with the posterior function Q:

$$Q(\hat{\lambda},\hat{\mu};y,m) = L(\hat{\lambda},\hat{\mu};y,m) + P_1(\hat{\mu}) + P_2(\hat{\mu}) + P_3(\hat{\lambda}).$$

The reconstruction of the activity $\hat{\lambda}$ and of the missing attenuation $\hat{\mu}$ is obtained by maximizing Q. This is done by alternated maximization. First, Q is increased by updating $\hat{\lambda}$ keeping $\hat{\mu}$ at its current value. Then, Q is further increased by updating $\hat{\mu}$. This sequence is considered a single iteration, and it is repeated until convergence is deemed satisfactory.

With fixed $\hat{\mu}$ the optimization of Q reduces to standard maximum-a-posteriori (MAP) reconstruction in emission tomography. Hence, an update of $\hat{\lambda}$ is computed with a single iteration of a MAP-algorithm, here we used the following algorithm:

$$\lambda_j = \frac{\lambda_j^{old}}{\sum_i c_{ij} - \frac{\partial M}{\partial \lambda_j}} \sum_i c_{ij} \frac{y_i}{\sum_k c_{ik} \lambda_k^{old}}, \text{ with}$$

$$\frac{\partial M_{jk}}{\partial \lambda_j} = -\beta \frac{(\lambda_j - \lambda_k)(\gamma|\lambda_j - \lambda_k| + \lambda_j + 3\lambda_k)}{(\lambda_j + \lambda_k + \gamma|\lambda_j - \lambda_k|)^2}$$

$$= -\beta \frac{(r_{jk} - 1)(\gamma|r_{jk} - 1| + r_{jk} + 3))}{(r_{jk} + 1 + \gamma|r_{jk} - 1|)^2},$$

where $\tau_{jk} = \lambda_j/\lambda_k$.

Beta is the strength of the prior and gamma introduces increased tolerance of the prior to large relative differences (as documented in Nuyts, TNS 2002) while k is the image pixel index belonging to the neighborhood of pixel j. In this step, the priors $P_1$, and $P_2$ can be ignored because they are independent of $\hat{\lambda}$. Combining equations (4) and (5) above, results in the following equation:

$$\hat{y}_i = \left(\sum_j g_{ij}\hat{\lambda}_j m_i\right) \exp\left(-\sum_{j \in U} l_{ij}\hat{\mu}_j\right).$$

Consequently, with fixed $\hat{\lambda}$, the optimization of Q reduces to standard MAP reconstruction in transmission tomography. The first factor in equation (7) above represents all activity along LOR i, weighted with the detection probabilities $g_{ik}$ and attenuated by the known attenuation in K. This quantity plays the role of the blank scan in standard transmission tomography. For the update of $\hat{\mu}$, we used a MAP reconstruction for transmission tomography with the priors $P_1$, and $P_2$. The reconstruction was accelerated by using ordered subsets.

Figure 2:
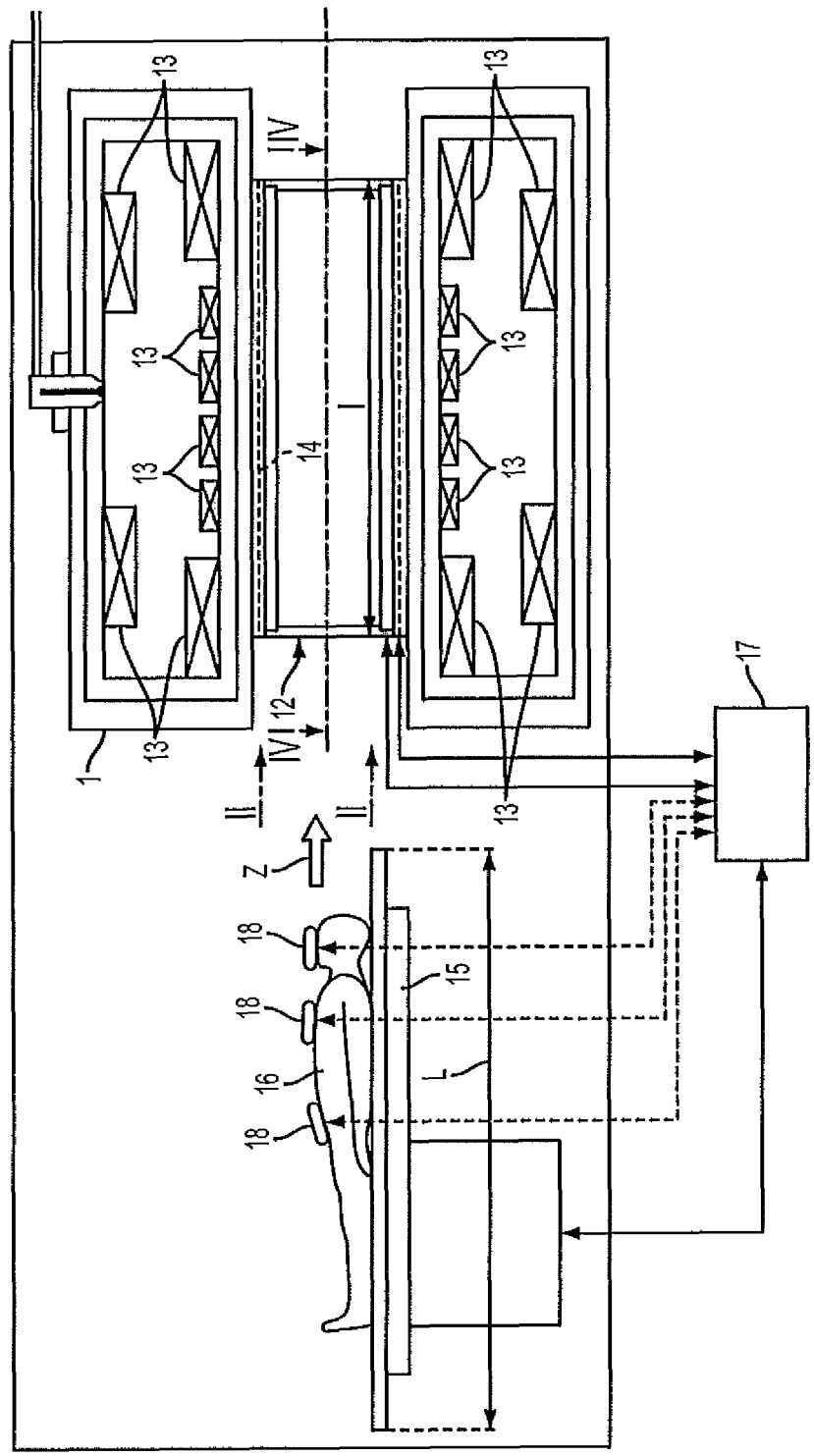
FIG. 2 is a perspective view of a PET imaging system.
Figure 5:
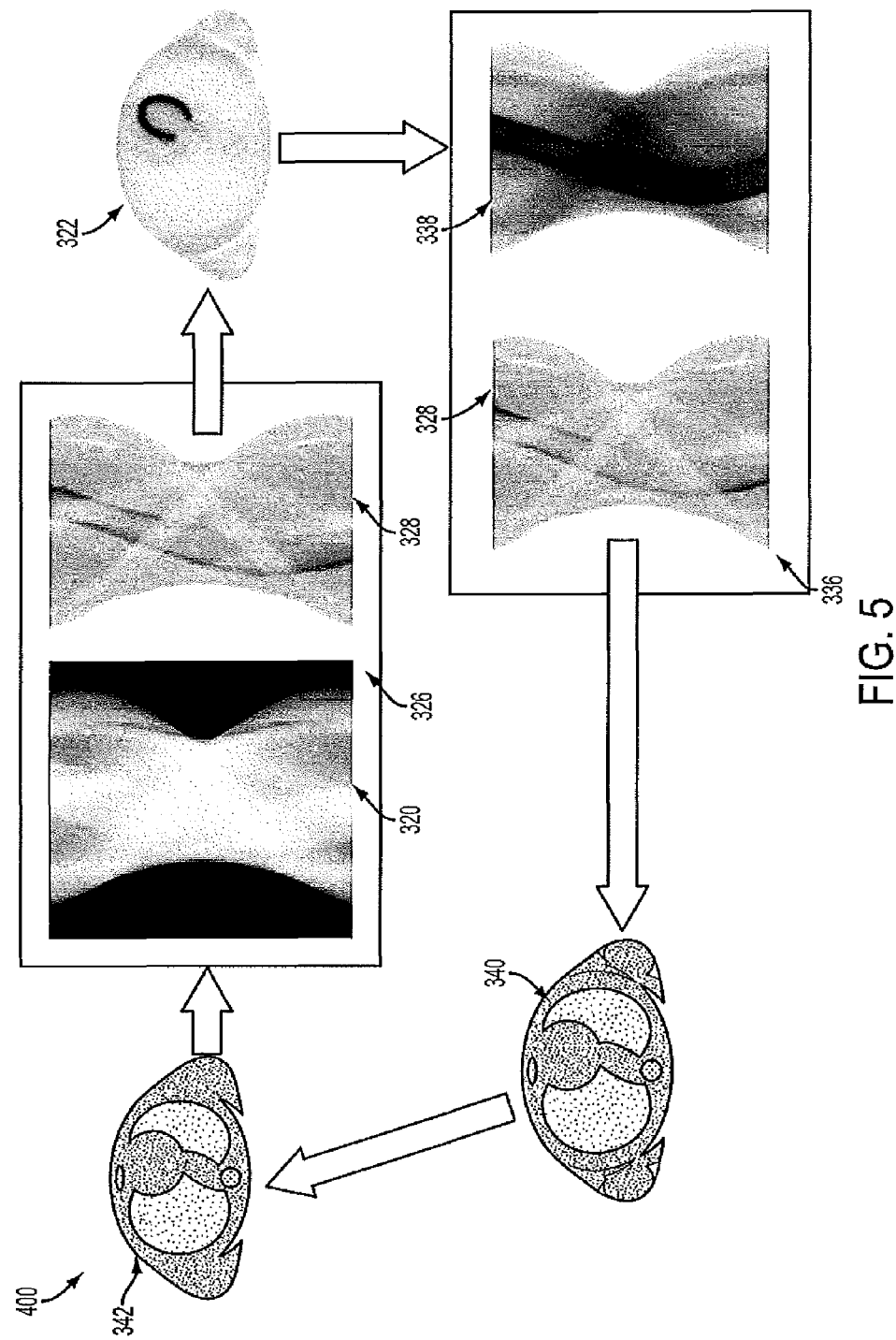
FIG. 5 is an illustration of the initial generation of an un-truncated attenuation map for which current attenuation correction is calculated by performing a forward projection process and making the exponent of the forward projection.
Figure 6:
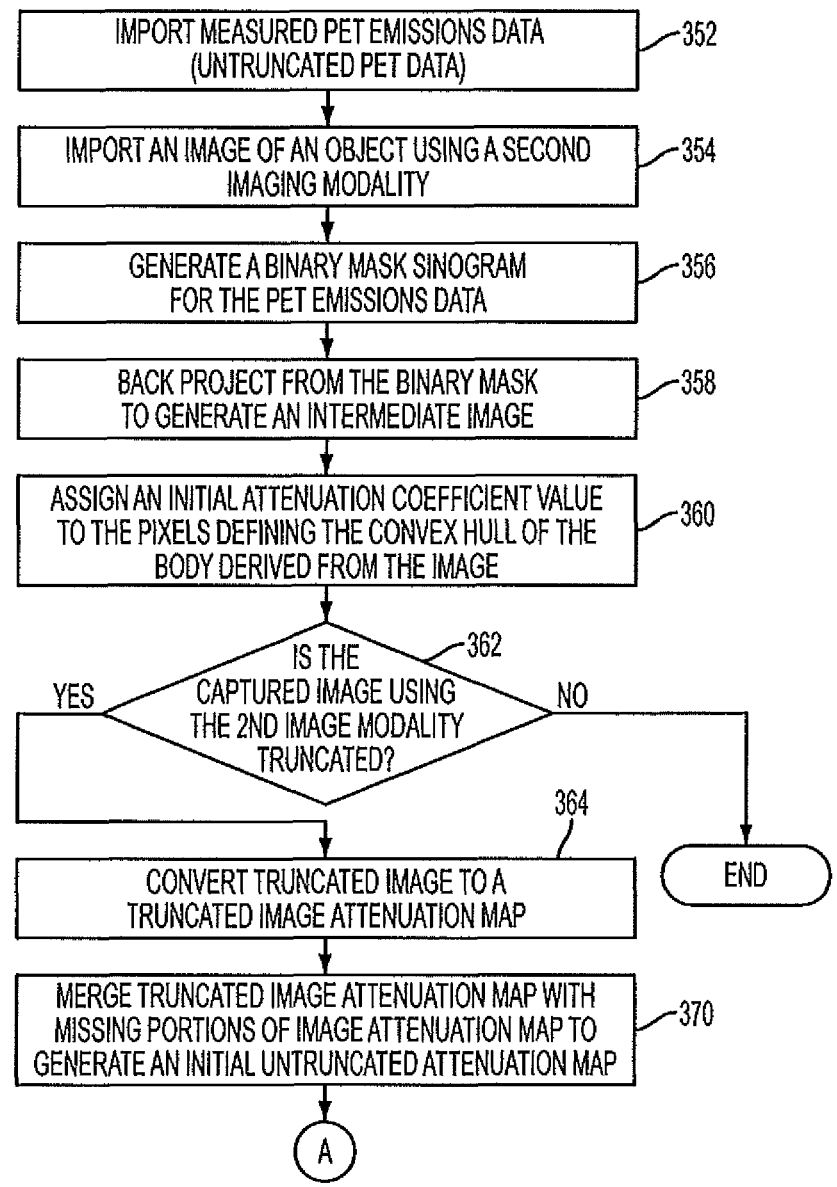
FIG. 6 is an illustration of the relative error in the reconstructed PET image as a function of a referenced standardized uptake value.

In one embodiment, the method of the present invention may be validated and evaluated using patient data derived from an integrated PET-CT imaging system. In this embodiment, the CT image data, which is truncated at 50 cm, is truncated artificially at 40 cm to correspond to the truncated field of view of the MR imager. In this embodiment, the present invention shall be applied to estimate the missing attenuation values. Emission images shall be reconstructed using 1) an untruncated attenuation map (reference), 2) a truncated attenuation map and 3) the truncated and a completed attenuation map. These images shall be compared to assess the severity of truncation induced errors, and the performance of the proposed completion algorithm. In performing the method, to estimate the missing attenuation values, several iterations of multiple subsets shall be applied. By way of example, three final emission images may be reconstructed applying the invention on three different data sets respectively. FIG. 2 shows maximum intensity projections of the three image sets (and their difference with the reference) for one particular patient. FIG. 5 illustrates the relative errors in the reconstructed PET emission images shown in FIG. 2 as a function of the reference standardized uptake value (SUV). The images illustrated in FIG. 2 show that the truncation of the arms causes the SUV to be underestimated by about 20%. After MLAA-based estimation of the missing attenuation values, this error is reduced to less than 5%.

FIG. 5 shows the relative error in the reconstructed PET emission images shown in FIG. 2; when emission image 220 is reconstructed with truncated attenuation 412, 414, 416, and when emission image 250 is reconstructed with attenuation "repaired" 402, 404, 406, as a function of a referenced standardized uptake value. Lines 402 and 412 display the mean relative error and show that above an SUV value of 2 (a threshold often used to classify a tumor as aggressive), neglecting the attenuation of the truncated arms results in a systematic underestimation of the SUV uptake by 10-20% (lines 412, 414, 416), while the bias becomes negligible when the attenuation has been processed by the MLAA algorithm (lines 402, 404, 406). Lines dotted 404, 406, 414 and 416 illustrate the standard deviation and the 10-90% percentile, respectively. This figure demonstrates that by using MLAA to complete the truncated attenuation map provided by any anatomical modality (CT, MR, US . . . ) in an integrated PET imager, we can correct the systematic underestimation of the tracer uptake, hence restore the accuracy of the diagnostic.

The above specification, examples and data provide a description of the manufacture and use of the invention. Since many embodiments of the invention can be made without departing from the spirit and scope of the invention, the invention resides in the claims hereinafter appended.

What is claimed is:

1. A method of generating a full image attenuation map of an object from a truncated image attenuation map of the object comprising the steps of:
    obtaining measured attenuated PET emissions data associated with the object using a plurality of detector pairs within an imaging system;
    obtaining data representative of a truncated image of the object using a second image modality;
    converting the data representative of a truncated image of the object to a truncated image attenuation map;
    an estimation module within the imaging system further performs the following steps:
        determining at least one missing portion of the truncated image attenuation map of the object;
        estimating image linear attenuation coefficients for the at least one missing portion of the truncated image attenuation map of the object; and
        generating the full image attenuation map of the object by combining the truncated image attenuation map and the estimated image linear attenuation coefficients for the at least one missing portion of the truncated image attenuation map of the object.

2. The method of claim 1 wherein the estimation module iteratively performs an estimation process on each successive image linear attenuation coefficients data set for the at least one missing portion of the truncated image of the object to generate a most likely image linear attenuation coefficients data set for the at least one missing portion of the truncated image of the object, wherein the iterative process is performed in a successive loop on each of the most likely image linear attenuation coefficients data sets until the measured improvement change in the most recently reconstructed emission images falls below a defined threshold improvement level.

3. The method of claim 1 wherein the second image modality is a Magnetic Resonance image scanner.

4. The method of claim 1 wherein the second image modality is a Computed Tomography image scanner.

5. The method of claim 1 wherein the second imaging modality within the imaging system is separate and distinct from a PET camera within the imaging system.

6. The method of claim 1 wherein the imaging system comprises a hybrid imaging system that integrates a PET imaging camera and the second imaging modality, wherein PET images recorded by the PET imaging camera and images recorded by the second imaging modality are recorded at least one of simultaneously and successively.

7. The method of claim 1 wherein the step of determining at least one missing portion of the truncated image attenuation map is performed by the following steps:
   (a) determining pixels that include data representative of measured attenuated PET emissions data; and
   (b) comparing the truncated image attenuation map of the object to the pixels that include data representative of measured attenuated PET emissions data for the object in order to determine pixels for which image attenuation coefficients are needed.

8. The method of claim 1 wherein the truncated image attenuation map comprises a plurality of pixels, each including linear attenuation coefficients.

9. The method of claim 7 wherein the step of deteimining pixels within the imaging system which include PET emission image data provides a determination of an outline of the object imaged, wherein the outline of the object imaged is used to determine those pixels for which attenuation data needs to be determined.

10. A method of generating a full image attenuation map from a truncated image attenuation map using comprising the steps of:
   obtaining measured attenuated PET emissions data of an object being imaged using a PET imaging modality;
   obtaining alternate image data utilizing an alternative imaging modality, wherein the alternate image data obtained is truncated;
   converting the truncated image data to a truncated image attenuation map;
   determining portions of the truncated image attenuation map for which attenuation coefficient data is missing;
   estimating, using an estimation module, the portions of the truncated image attenuation map using PET emission data and the central portion of the attenuation map for which attenuation coefficient data is missing, wherein the estimation module iteratively estimates attenuation values for the missing portions of the truncated image following each successive determination of estimated attenuation values for the missing portions of the truncated image until the estimated attenuation values are within an acceptable range; and
   combining the truncated image attenuation map and the attenuation values for the missing portions of the truncated image and thereby creating the full attenuation map.

11. The method of claim 10 wherein the step performed by the estimation module of iteratively estimating attenuation values is performed in a successive loop on each successive estimate of attenuation values for the missing portions of the truncated image until an improved difference between improved difference between successively estimated attenuation values for the missing portions of the truncated image are within a previously defined threshold range.

\* \* \* \* \*